US008842104B2

(12) United States Patent
Peng et al.

(10) Patent No.: US 8,842,104 B2
(45) Date of Patent: Sep. 23, 2014

(54) BISTABLE DISPLAY AND METHOD OF DRIVING PANEL THEREOF

(75) Inventors: De-Zhang Peng, Taoyuan County (TW); Huan-Hsin Li, Miaoli County (TW)

(73) Assignee: Au Optronics Corporation, Hsinchu (TW)

( * ) Notice: Subject to any disclaimer, the term of this patent is extended or adjusted under 35 U.S.C. 154(b) by 657 days.

(21) Appl. No.: 13/073,987

(22) Filed: Mar. 28, 2011

(65) Prior Publication Data

US 2012/0169676 A1 Jul. 5, 2012

(30) Foreign Application Priority Data

Dec. 31, 2010 (TW) ............................... 99147240 A

(51) Int. Cl.

| | |
|---|---|
| ***G06F 3/038*** | (2013.01) |
| ***G09G 5/00*** | (2006.01) |
| ***G09G 3/34*** | (2006.01) |
| ***G09G 3/20*** | (2006.01) |
| *G09G 3/36* | (2006.01) |
| *G09G 5/06* | (2006.01) |

(52) U.S. Cl.

CPC ............ *G09G 3/2007* (2013.01); *G09G 3/3433* (2013.01); *G09G 3/3651* (2013.01); *G09G 2320/041* (2013.01); *G09G 5/06* (2013.01); *G09G 2380/14* (2013.01)

USPC .......................................... 345/204; 345/602

(58) Field of Classification Search

CPC ................................ G09G 5/36; G09G 5/393

USPC ................ 345/87, 89, 98, 547, 690, 601, 602

See application file for complete search history.

(56) References Cited

U.S. PATENT DOCUMENTS

| | | | |
|---|---|---|---|
| 2005/0146495 | A1 | 7/2005 | MacKinnon et al. |
| 2006/0114480 | A1 | 6/2006 | Chang et al. |
| 2006/0158415 | A1 | 7/2006 | Izumi |
| 2007/0075962 | A1 | 4/2007 | Zhou et al. |

(Continued)

FOREIGN PATENT DOCUMENTS

| | | |
|---|---|---|
| CN | 101494028 | 7/2009 |
| CN | 101567168 | 10/2009 |
| TW | 200525267 | 8/2005 |

(Continued)

OTHER PUBLICATIONS

"Office Action of Taiwan Counterpart Application", issued on Jul. 15, 2013, p1-p9, in which the listed references were cited.

"First Office Action of China counterpart application" issued on Apr. 26, 2012, p1-p5, in which CN101494028 and CN101567168 were cited.

*Primary Examiner* — Ricardo L Osorio

(74) *Attorney, Agent, or Firm* — Jianq Chyun IP Office

(57) ABSTRACT

A bistable display and a method of driving a panel thereof are provided. The present invention would set the driving information lookup table (DLUT) and the corresponding reference information relating to each frame of the bistable display in advance, and look up the previous frame driving data and/or the current frame driving data of the panel according to the set reference information and thus obtaining information for driving each pixel of the panel. Accordingly, not only the memory space of the built-in DLUTs can be substantially reduced and thus saving the usage cost of memories, but also the time for download DLUTs from the external memory unit by the timing controller (T-con) can be reduced so as to promote the operation performance of the whole bistable display and thus further increasing the speed of the panel.

20 Claims, 2 Drawing Sheets

(56) References Cited

U.S. PATENT DOCUMENTS

| | | | | |
|---|---|---|---|---|
| 2007/0182687 | A1* | 8/2007 | Kim et al. | 345/98 |
| 2009/0189841 | A1 | 7/2009 | Chen et al. | |
| 2009/0309890 | A1* | 12/2009 | Mizuno et al. | 345/547 |
| 2010/0156878 | A1 | 6/2010 | Chen et al. | |
| 2011/0063337 | A1* | 3/2011 | Lin et al. | 345/690 |

FOREIGN PATENT DOCUMENTS

| | | |
|---|---|---|
| TW | 200632832 | 9/2006 |
| TW | 201025270 | 7/2010 |

* cited by examiner

BISTABLE DISPLAY AND METHOD OF DRIVING PANEL THEREOF

CROSS-REFERENCE TO RELATED APPLICATION

This application claims the priority benefit of Taiwan application serial no. 99147240, filed Dec. 31, 2010. The entirety of the above-mentioned patent application is hereby incorporated by reference herein and made a part of this specification.

BACKGROUND OF THE INVENTION

1. Field of the Invention

The present invention relates to a flat display technology, more particularly, to a bistable display and a method of driving a panel thereof.

2. Description of the Related Art

The bistable display is a kind of display with using bistable medium to perform displaying. And, the techniques of achieving the bistable displaying include the electronic ink (E-Ink) display, the cholesteric liquid crystal display (ChLCD), the electrophoretic display (EPD), the electrowetting display (EWD), or the quick response-liquid powder display (QR-LPD), etc. With the increasing use of portable electronic devices, products such as electronic papers (e-papers) and electronic books (e-books) have gradually caught the attention of the market.

In general, the e-papers and the e-books display images by adopting the technique of EPD. Take the monochrome e-books for example, each of the pixels in the e-books is mainly composed of electrophoresis buffer with black color and white charged particles doped in the electrophoresis buffer. By providing voltages to the pixels, the white charged particles are driven to shift so that each of the pixels could display black, white, or different gray level. In addition, take the color e-books for example, each of the pixels in the e-books is mainly composed of electrophoresis buffers of red, green and blue colors respectively with the doped white charged particles and formed in the different microcups. By providing voltages to the pixels, the white charged particles are driven to shift so that each of the pixels could display red, green, blue, or different color level.

The current techniques of driving the EPD with particles almost adopt the manner of lookup tables (LUTs) to obtain the driving information for driving each of the pixels in the EPD panel. However, each of the driving information LUTs built-in the EPD must include multi-dimensional data array, namely, at least four dimensional data array with initial state, final state and two prior states of each pixel. In other words, each of the driving information LUTs built-in the EPD must include double frame or the above of the driving information LUTs, namely, the previous and the current frames of the driving information LUTs, or two previous and one current frames of the driving information LUTs. Therefore, with the increasing of color levels supported by the bistable display, the memory space of the built-in lookup tables is getting higher and higher, and thus greatly increasing the usage cost of memories.

SUMMARY OF THE INVENTION

Accordingly, the present invention is directed to a bistable display and a method of driving a panel thereof in order to effectively resolve aforementioned problems in the conventional techniques.

The present invention provides a bistable display including a bistable display panel and a driving apparatus, wherein the driving apparatus is coupled to the bistable display panel and includes two or above of lookup mechanisms.

The present invention also provides a method for driving a bistable display panel, and the method includes providing two or above of reference information each corresponding to a lookup mechanism; selecting one of the reference information according to an input value; and determining an output value by using the lookup mechanism corresponding to the selected reference information.

In one embodiment of the present invention, each of the lookup mechanisms includes a reference information and a corresponding driving information lookup table. And, the driving information lookup tables include a plurality of single-frame driving information lookup tables and a plurality of double-frame driving information lookup tables.

In one embodiment of the present invention, a part of the single-frame driving information lookup tables has previous frame driving data of the bistable display panel, and the rest of the single-frame driving information lookup tables have current frame driving data of the bistable display panel.

In one embodiment of the present invention, each of the double-frame driving information lookup tables has previous frame driving data and current frame driving data of the bistable display panel.

From the above, in the techniques of driving the EPD with particles, since the driving information of the display panel in the driving information lookup tables are all preset in the memory space by designer, such that, in the present invention, a procedure is additionally added when the driving information lookup tables are preset by designer, namely, an additional reference information lookup table is established, so as to reduce the memory space required by the built-in driving information lookup tables as well as the memory space required by the additional reference information lookup table is very small. In this case, by presetting the reference information of the reference information lookup table relating to each frame of the bistable display, the driving information for driving each pixel in the bistable display panel can be obtained by looking up the previous frame driving data and/or the current frame driving data of the bistable display panel according to the preset reference information. Accordingly, the memory space of the built-in lookup tables can be substantially reduced and thus saving the usage cost of memories.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Figure 1:
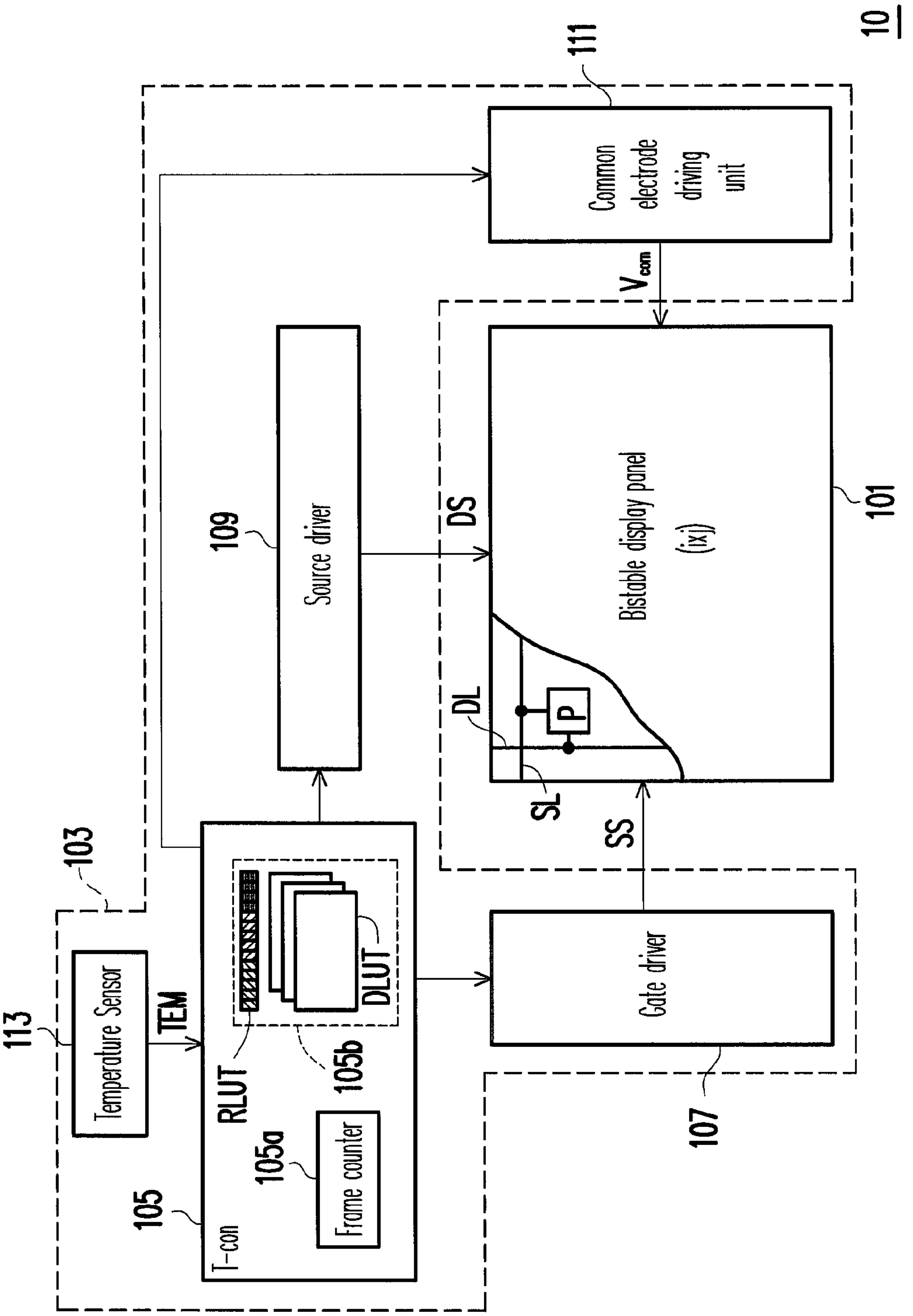
FIG. 1 is a diagram of a bistable display according to one embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a diagram of a bistable display 10 according to one embodiment of the present invention. Referring to FIG. 1, the bistable display 10 includes a bistable display panel 101 and a driving apparatus 103. In the present embodiment, the bistable display panel 101 includes a plurality of scan lines SL, a plurality of data lines DL, and a plurality of pixels P. The data lines DL are substantially and vertically disposed with the scan lines SL. All of the pixels P are arranged in an array, and each of the pixels P is electrically connected to the corresponding data line DL and the corresponding scan line SL.

It should be noted that, in the present embodiment, the bistable display panel 101 may be a microcup electrophoretic display (EPD) panel, but not limited thereto, namely, the bistable display panel 101 may be the other type of the bistable display panels, for example, an electronic ink (E-Ink) display panel, an electrowetting display (EWD) panel, a quick response-liquid powder display (QR-LPD) panel, or a cholesteric liquid crystal display (ChLCD) panel. If the bistable display panel 101 is the microcup EPD panel, each of the pixels P may be composed of electrophoresis buffers of red, green and blue colors respectively with the doped white charged particles and formed in the different microcups. However, the structures of the above-mentioned bistable display panels are well known in the art, so the detail descriptions thereto are omitted.

In addition, the driving apparatus 103 is coupled to the bistable display panel 101. The driving apparatus 103 is used for performing different lookup mechanisms according to different reference information, and obtaining the pixel driving information through such different lookup mechanisms to drive the bistable display panel 101, and thus each of the pixels P in the bistable display panel 101 may reach to the target gray level. In other words, the driving apparatus 103 includes two or above of lookup mechanisms, and each of the lookup mechanisms includes a reference information and a corresponding driving information lookup table. Compared with the prior art, the traditional of driving manner for EPD adopts single lookup mechanism (i.e. looking up the double frame driving information lookup tables fixedly, or looking up two or above of multi-frame driving information lookup tables fixedly) to obtain the pixel driving information for directly driving the bistable display panel.

To be specific, the driving apparatus 103 may include a timing controller (T-con) 105, a gate driver 107, a source driver 109, a common electrode driving unit 111, and a temperature sensor 113. The timing controller 105 may have a frame counter 105*a* and a memory unit 105*b*. Of course, in the other embodiments of the present invention, the memory unit 105*b* can be disposed outside the timing controller 105. It can be determined by the actual design requirement.

In the present embodiment, the frame counter 105*a* is used for assisting with the timing controller 105, such that the timing controller 105 can obtain the time of each frame of the bistable display 10.

In the other hands, the memory unit 105*b* may be a flash memory or a random access memory (RAM), but not limited thereto. And, the memory unit 105*b* is used for storing a reference information lookup table RLUT and a plurality of driving information lookup tables DLUTs. The reference information lookup table RLUT has the reference information relating to each frame of the bistable display 10. Each of the reference information may be a 2-bit value, namely, “00”, “01”, “10” and “11”, but not limited thereto, and the reference information lookup table RLUT may be updated by a burning software.

In addition, all of the driving information lookup tables DLUTs built-in the memory unit 105*b* include a plurality of single-frame driving information lookup tables and a plurality of double-frame driving information lookup tables. In the present embodiment, a part of the single-frame driving information lookup tables DLUT has previous frame driving data of the bistable display panel 101, and the rest of the single-frame driving information lookup tables DLUT have current frame driving data of the bistable display panel 101. Furthermore, each of the double-frame driving information lookup tables DLUT has previous frame driving data and current frame driving data of the bistable display panel 101.

From the above, when the driving apparatus 103 drives the bistable display panel 101, the timing controller 105 would find out the reference information (i.e. a single reference information with 2-bit) relating to the frame and which is preset in the reference information lookup table RLUT according to the counting information provided by the frame counter 105*a*, and then use the lookup mechanism corresponding to the found reference information to look up the driving information lookup table DLUT. Accordingly, the timing controller 105 would obtain the pixel driving information to control the operations of the gate driver 107, the source driver 109 and the common electrode driving unit 111.

To be specific, the gate driver 107 would generate the scan signals SS in response to the pixel driving information obtained by the timing controller 105 so as to sequentially turn on each pixel row of the bistable display panel 101. The source driver 109 would generate a plurality of data signals DS in response to the pixel driving information obtained by the timing controller 105 so as to correspondingly driving the pixel row turned on by the gate driver 107. The common electrode driving unit 111 would generate and provide the common voltage Vcom to the common electrode of the bistable display panel 101 in response to the pixel driving information obtained by the timing controller 105.

In the present embodiment, the bistable display 10 would be situated in three states in sequence, namely starting from the mechanical balance state to the reset state, and then from the reset state to the driving state, but not limited thereto. It can be determined by the actual design requirement.

First, when the bistable display 10 is situated in the mechanical balance state, the reference information read from the reference information lookup table RLUT by the timing controller 105 may be 2-bit information with “00”, and may be corresponding to the single-frame driving information lookup table DLUT with the previous frame driving data of the bistable display panel 101. Accordingly, since the timing controller 105 can be known the previous frame driving data relating to each of the pixels P of the bistable display panel 101, so that the timing controller 105 can use the driving voltages opposite to the previous frame driving data relating to each of the pixels P of the bistable display panel 101 to drive each of the pixels P, so as to make the white charged particles in each of the pixels P of the bistable display panel 101 restore to the original state, and thus achieving the purpose of mechanical balancing.

Next, when the bistable display 10 is situated in the reset state, the reference information read from the reference information lookup table RLUT by the timing controller 105 may be 2-bit information with “10”, and may be corresponding to the double-frame driving information lookup table DLUT with the previous frame driving data and the current frame driving data of the bistable display panel 101. Accordingly, since the timing controller 105 can be known the previous frame driving data and the current frame driving data both relating to each of the pixels P of the bistable display panel 101, so that the timing controller 105 can generate the driving voltages corresponding to the previous frame driving data and the current frame driving data both relating to each of the pixels P of the bistable display panel 101 to drive each of the pixels P, so as to make the white charged particles in each of the pixels P of the bistable display panel 101 shift to the top-most or the bottom-most, and thus achieving the purpose of resetting.

Finally, when the bistable display 10 is situated in the driving state, the reference information read from the reference information lookup table RLUT by the timing controller 105 may be 2-bit information with “01”, and may be corresponding to the single-frame driving information lookup table DLUT with the current frame driving data of the bistable display panel 101. Accordingly, since the timing controller 105 can be known the current frame driving data relating to each of the pixels P of the bistable display panel 101, so that the timing controller 105 can generate the driving voltages corresponding to the current frame driving data relating to each of the pixels P of the bistable display panel 101 to drive each of the pixels P, so as to make the white charged particles in each of the pixels P of the bistable display panel 101 shift from the top-most or the bottom-most position under the reset state to the target position. Of course, in the other embodiments of the present embodiments, the timing controller 105 also can generate the driving voltages corresponding to the previous frame driving data and the current frame driving data both relating to each of the pixels P of the bistable display panel 101 to drive each of the pixels P. The present invention does not limit to drive each pixel P by only using the current frame driving data relating to each pixel P nothing more. It can be determined by the actual design requirement.

Herein, it is obviously known that the timing controller 105 would look up the previous frame driving data and/or the current frame driving data of the bistable display panel 101 according to the reference information preset in the reference information lookup table RLUT, so as to obtain the driving information for driving each pixel P of the bistable display panel 101. Accordingly, the timing controller 105 obtains the pixel driving information to drive the bistable display panel 101 by only looking up the single-frame driving information lookup table DLUTs with the current frame driving data of the bistable display panel 101 rather than as the prior art to fixedly establish double-frame driving information lookup tables, or to fixedly establish two or above of multi-frame driving information lookup tables.

Therefore, not only the memory space of the built-in driving information lookup tables DLUT can be substantially reduced and thus saving the usage cost of memories due to the traditional of driving manner for EPD would constantly look up the driving information lookup tables each with multi-dimensional (four dimensional) data array rather than as the present invention would changefully look up the single/double-frame driving information lookup tables DLUT with the previous/current frame driving data of the bistable display panel 101; but also the time for download driving information lookup tables DLUT from the external memory unit by the timing controller (T-con) 105 can be reduced so as to promote the operation performance of the whole bistable display 10 and thus further increasing the speed of the bistable display panel 101.

Of course, in the present embodiment, since the bistable display 10 is very sensitive to the variation of the ambient temperature, so the timing controller 105 further may appropriately adjust the lookup mechanisms performed on the memory unit 105*b* by referring the temperature information TEM provided by the temperature sensor 113, so as to compensate the driving of the bistable display panel 101 in response to the variation of the ambient temperature. In other words, the timing controller 105 may select one of the reference information built-in the reference information lookup table RLUT by referring the temperature information TEM provided by the temperature sensor 113, and then use the lookup mechanism corresponding to the selected reference information to determine an output value (i.e. the pixel driving information), and thus compensating the driving of the bistable display panel 101 in response to the variation of the ambient temperature.

Figure 2:
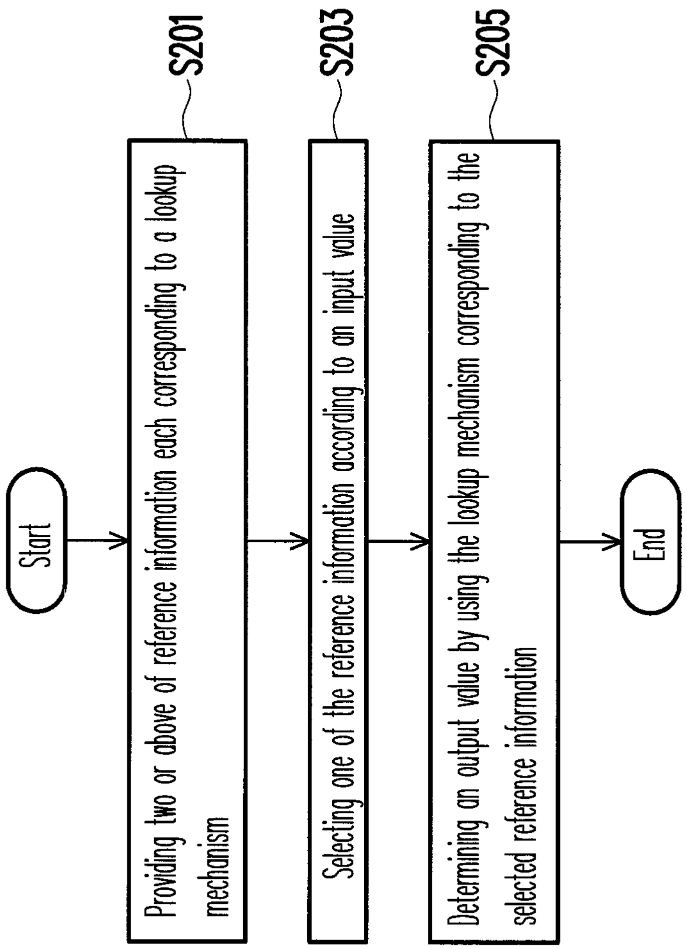
FIG. 2 is a flow chart of a method for driving a bistable display panel according to one embodiment of the present invention.

From the above disclosure/teaching of the above embodiments, a general principle can be concluded as shown in FIG. 2. FIG. 2 is a flow chart of a method for driving a bistable display panel according to one embodiment of the present invention. Referring to FIG. 2, the method of the present embodiment includes providing two or above of reference information each corresponding to a lookup mechanism (in Step S201); selecting one of the reference information according to an input value (i.e. the 2-bit information or the temperature information TEM as the above-mentioned embodiments) (in Step S203); and determining an output value (i.e. the pixel driving information) by using the lookup mechanism corresponding to the selected reference information (in Step S205).

Similarly, in the present embodiment, each of the lookup mechanisms is corresponding to a driving information lookup table. The driving information lookup tables include a plurality of single-frame driving information lookup tables and a plurality of double-frame driving information lookup tables. A part of the single-frame driving information lookup tables has previous frame driving data of the bistable display panel, and the rest of the single-frame driving information lookup tables have current frame driving data of the bistable display panel. Each of the double-frame driving information lookup tables has previous frame driving data and current frame driving data of the bistable display panel. Herein, it should be noted that the usage time of the single/double-frame driving information lookup tables can be changed by the different designs.

In summary, the present invention would set the driving information lookup table (DLUT) and the corresponding reference information relating to each frame of the bistable display in advance, and look up the previous frame driving data and/or the current frame driving data of the panel according to the set reference information and thus obtaining information for driving each pixel of the bistable display panel. Accordingly, not only the memory space of the built-in DLUTs can be substantially reduced and thus saving the usage cost of memories, but also the time for download DLUTs from the external memory unit by the timing controller (T-con) can be reduced so as to promote the operation performance of the whole bistable display and thus further increasing the speed of the bistable display panel. Obviously, the benefit can be further promoted more and more under the present invention is applied in the bistable display panel with using the design of resetting on the DLUTs, for example, the EPD panel, the E-Ink display panel, the EWD panel, the QR-LPD panel, or the ChLCD panel.

It will be apparent to those skills in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A bistable display, comprising:

a bistable display panel; and a driving apparatus, coupled to the bistable display panel, the driving apparatus comprises two or above of lookup mechanisms, wherein each of the lookup mechanisms comprises a reference information and a driving information lookup table corresponding to the reference information, and the reference information of the lookup mechanisms corresponds to an operation state of the bistable display panel, the reference information is a 2-bit information.

2. The bistable display according to claim 1, further comprising:

a memory unit, for storing the reference information and the driving information lookup tables.

3. The bistable display according to claim 1, wherein the driving information lookup tables comprise a plurality of single-frame driving information lookup tables and a plurality of double-frame driving information lookup tables.

4. The bistable display according to claim 3, wherein a part of the single-frame driving information lookup tables has previous frame driving data of the bistable display panel, and the rest of the single-frame driving information lookup tables have current frame driving data of the bistable display panel.

5. The bistable display according to claim 3, wherein each of the double-frame driving information lookup tables has previous frame driving data and current frame driving data of the bistable display panel.

6. The bistable display according to claim 1, wherein the bistable display panel comprises a microcup electrophoretic display (EPD) panel, an electronic ink (E-Ink) display panel, an electrowetting display (EWD) panel, a quick response-liquid powder display (QR-LPD) panel, or a cholesteric liquid crystal display (ChLCD) panel.

7. The bistable display according to claim 1, wherein the operation state of the bistable display comprises a mechanical balance state, a reset state and a driving state, and the bistable display enters into the operation state in a sequence of the mechanical balance state, the reset state, and the driving state.

8. The bistable display according to claim 7, wherein, when the bistable display is in the mechanical balance state, a single-frame driving information lookup table with a previous frame driving data of the bistable display panel is utilized in response to the reference information of the mechanical balance state.

9. The bistable display according to claim 7, wherein, when the bistable display is in the reset state, a double-frame driving information lookup table with the previous frame driving data and the current frame driving data of the bistable display panel is utilized in response to the reference information of the reset state.

10. The bistable display according to claim 7, wherein, when the bistable display is in the driving state, a single-frame driving information lookup table with the current frame driving data of the bistable display panel is utilized in response to the reference information of the driving state.

11. A method for driving a bistable display panel, comprising:

providing two or above of reference information each corresponding to a lookup mechanism, wherein the reference information of the lookup mechanisms corresponds to an operation state of the bistable display panel respectively;

selecting one of the reference information according to an input value; and determining an output value by using the lookup mechanism corresponding to the selected reference information.

12. The method according to claim 11, wherein each of the lookup mechanisms is corresponding to a driving information lookup table.

13. The method according to claim 12, wherein the driving information lookup tables comprise a plurality of single-frame driving information lookup tables and a plurality of double-frame driving information lookup tables.

14. The method according to claim 13, wherein a part of the single-frame driving information lookup tables has previous frame driving data of the bistable display panel, and the rest of the single-frame driving information lookup tables have current frame driving data of the bistable display panel.

15. The method according to claim 13, wherein each of the double-frame driving information lookup tables has previous frame driving data and current frame driving data of the bistable display panel.

16. The method according to claim 11, wherein the input value comprises a temperature information.

17. The method according to claim 11, wherein the operation state of the bistable display panel comprises a mechanical balance state, a reset state and a driving state, and the bistable display panel enters into the operation state in a sequence of the mechanical balance state, the reset state, and the driving state.

18. The method according to claim 17, wherein, when the bistable display panel is in the mechanical balance state, a single-frame driving information lookup table with a previous frame driving data of the bistable display panel is utilized in response to the reference information of the mechanical balance state.

19. The method according to claim 17, wherein, when the bistable display panel is in the reset state, a double-frame driving information lookup table with the previous frame driving data and the current frame driving data of the bistable display panel is utilized in response to the reference information of the reset state.

20. The method according to claim 17, wherein, when the bistable display panel is in the driving state, a single-frame driving information lookup table with the current frame driving data of the bistable display panel is utilized in response to the reference information of the driving state.

* * * * *